(12) United States Patent
Temblador

(10) Patent No.: US 11,145,433 B2
(45) Date of Patent: *Oct. 12, 2021

(54) FLEXIBLE CABLE WITH STRUCTURALLY ENHANCED CONDUCTORS

(71) Applicant: SOUTHWIRE COMPANY, LLC, Carrollton, GA (US)

(72) Inventor: Richard Temblador, Temecula, CA (US)

(73) Assignee: Southwire Company, LLC, Carrollton, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/442,874

(22) Filed: Jun. 17, 2019

(65) Prior Publication Data

US 2019/0304623 A1    Oct. 3, 2019

Related U.S. Application Data

(63) Continuation of application No. 12/792,642, filed on Jun. 2, 2010, now Pat. No. 10,325,696.

(51) Int. Cl.
*H01B 7/18*    (2006.01)
*H01B 13/14*   (2006.01)
*H01B 9/02*    (2006.01)

(52) U.S. Cl.
CPC ........... *H01B 7/189* (2013.01); *H01B 13/148* (2013.01); *H01B 9/028* (2013.01); *Y10T 29/49117* (2015.01)

(58) Field of Classification Search
CPC ........ H01B 9/028; H01B 7/0869; H01B 7/17; H01B 7/18; H01B 7/189; H01B 7/20; H01B 7/24; H01B 7/228; H01B 13/148; Y10T 29/4917

USPC ............ 174/105 R, 110 R, 113 C, 98, 99 R, 174/102 P, 103, 107, 102 D

See application file for complete search history.

(56) References Cited

U.S. PATENT DOCUMENTS

| | | | |
|---|---|---|---|
| 1,782,787 A | * | 11/1930 | McAuliffe ............. H01B 9/028 174/109 |
| 2,043,044 A | | 6/1936 | Knoderer |
| 2,120,088 A | | 6/1938 | Carlson |
| 2,276,437 A | | 3/1942 | Vaala |
| 2,685,707 A | | 8/1954 | Llewellyn et al. |

(Continued)

FOREIGN PATENT DOCUMENTS

| | | |
|---|---|---|
| DE | 44 10 456 | 9/1995 |
| EP | 0 364 717 | 4/1990 |

(Continued)

OTHER PUBLICATIONS

Axel Plastics Research Laboratories, Inc., Product Data Sheet re "Mold Wiz, INT-33PA" (Approx. 2000) (1p).

(Continued)

*Primary Examiner* — Roshn K Varghese
(74) *Attorney, Agent, or Firm* — Merchant & Gould P.C.

(57) ABSTRACT

In an electrical cable of the type having an outer sheath enclosing a conductor assembly comprising a plurality of insulated conductors disposed within a binder, the binder having a crush resistance for protecting the insulated conductors, an improvement in which a strength enhancer is applied such that the binder can be removed without decreasing a crush resistance of the electrical cable.

22 Claims, 2 Drawing Sheets

(56) References Cited

U.S. PATENT DOCUMENTS

| | | |
|---|---|---|
| 2,930,838 A | 3/1960 | Chizallet et al. |
| 3,064,073 A | 11/1962 | Downing |
| 3,108,981 A | 10/1963 | Clark et al. |
| 3,191,005 A | 6/1965 | Cox, II |
| 3,258,031 A | 6/1966 | French |
| 3,378,628 A | 4/1968 | Garner |
| 3,452,434 A | 7/1969 | Wagele |
| 3,668,175 A | 6/1972 | Sattler |
| 3,849,221 A | 11/1974 | Middleton |
| 3,852,875 A | 12/1974 | McAmis et al. |
| 3,868,436 A | 2/1975 | Ootsuji et al. |
| 3,877,142 A | 4/1975 | Hamano et al. |
| 3,885,286 A | 5/1975 | Hill |
| 3,936,572 A | 2/1976 | MacKenzie, Jr. et al. |
| 4,002,797 A | 1/1977 | Hacker et al. |
| 4,057,956 A | 11/1977 | Tolle |
| 4,099,425 A | 7/1978 | Moore |
| 4,100,245 A | 7/1978 | Horikawa et al. |
| 4,137,623 A | 2/1979 | Taylor |
| 4,273,806 A | 6/1981 | Stechler |
| 4,274,509 A | 6/1981 | Thomson et al. |
| 4,275,096 A | 6/1981 | Taylor |
| 4,299,256 A | 11/1981 | Bacehowski et al. |
| 4,356,139 A | 10/1982 | Rowland et al. |
| 4,360,492 A | 11/1982 | Rowland et al. |
| 4,416,380 A | 11/1983 | Flum |
| 4,454,949 A | 6/1984 | Flum |
| 4,522,733 A | 6/1985 | Jonnes |
| 4,569,420 A | 2/1986 | Pickett et al. |
| 4,605,818 A | 8/1986 | Arroyo et al. |
| 4,611,656 A | 9/1986 | Kendall, Jr. et al. |
| 4,673,516 A | 6/1987 | Berry |
| 4,684,214 A | 8/1987 | Goldmann et al. |
| 4,693,936 A | 9/1987 | McGregor et al. |
| 4,749,059 A | 6/1988 | Jonnes et al. |
| 4,751,261 A | 6/1988 | Miyata et al. |
| 4,806,425 A | 2/1989 | Chu-Ba |
| 4,937,142 A | 6/1990 | Ogushi et al. |
| 4,952,021 A | 8/1990 | Aoki et al. |
| 4,965,249 A | 10/1990 | De With et al. |
| 5,036,121 A | 7/1991 | Coaker et al. |
| 5,055,522 A | 10/1991 | Ikeda et al. |
| 5,074,640 A | 12/1991 | Hardin et al. |
| 5,225,635 A | 7/1993 | Wake et al. |
| 5,227,080 A | 7/1993 | Berry |
| 5,252,676 A | 10/1993 | Suyama et al. |
| 5,326,638 A | 7/1994 | Mottine, Jr. et al. |
| 5,356,710 A | 10/1994 | Rinehart |
| 5,383,799 A | 1/1995 | Fladung |
| 5,460,885 A | 10/1995 | Chu-Ba |
| 5,505,900 A | 4/1996 | Suwanda et al. |
| 5,561,730 A | 10/1996 | Lochkovic et al. |
| 5,565,242 A | 10/1996 | Buttrick, Jr. et al. |
| 5,614,288 A | 3/1997 | Bustos |
| 5,614,482 A | 3/1997 | Baker et al. |
| 5,656,371 A | 8/1997 | Kawahigashi et al. |
| 5,660,932 A | 8/1997 | Durston et al. |
| 5,733,823 A | 3/1998 | Sugioka et al. |
| 5,753,861 A | 5/1998 | Hansen et al. |
| 5,852,116 A | 12/1998 | Cree et al. |
| 5,856,405 A | 1/1999 | Hofmann |
| 5,886,072 A | 3/1999 | Linsky et al. |
| 5,912,436 A | 6/1999 | Sanchez et al. |
| 5,925,601 A | 7/1999 | McSherry et al. |
| 6,057,018 A | 5/2000 | Schmidt |
| 6,064,073 A | 5/2000 | Hoogenraad et al. |
| 6,080,489 A | 6/2000 | Mehta |
| 6,114,036 A | 9/2000 | Rinehart et al. |
| 6,137,058 A | 10/2000 | Moe et al. |
| 6,146,699 A | 11/2000 | Bonicel et al. |
| 6,159,617 A | 12/2000 | Foster et al. |
| 6,179,665 B1 | 1/2001 | Rossman et al. |
| 6,188,026 B1 | 2/2001 | Cope et al. |
| 6,228,495 B1 | 5/2001 | Lupia et al. |
| 6,270,849 B1 | 8/2001 | Popoola et al. |
| 6,281,431 B1 | 8/2001 | Cumley |
| 6,327,841 B1 | 12/2001 | Bertini et al. |
| 6,347,561 B2 | 2/2002 | Uneme et al. |
| 6,395,989 B2 | 5/2002 | Lecoeuvre et al. |
| 6,416,813 B1 | 7/2002 | Valls Prats et al. |
| 6,418,704 B2 | 7/2002 | Bertini et al. |
| 6,461,730 B1 | 10/2002 | Bachmann et al. |
| 6,474,057 B2 | 11/2002 | Bertini et al. |
| 6,534,717 B2 | 3/2003 | Suzuki et al. |
| 6,640,533 B2 | 11/2003 | Bertini et al. |
| 6,646,205 B2 | 11/2003 | Hase et al. |
| 6,810,188 B1 | 10/2004 | Suzuki et al. |
| 6,850,681 B2 | 2/2005 | Lepont et al. |
| 6,903,264 B2 | 6/2005 | Watanabe et al. |
| 6,906,258 B2 | 6/2005 | Hirai et al. |
| 6,906,264 B1 | 6/2005 | Grant et al. |
| 6,977,280 B2 | 12/2005 | Lee et al. |
| 7,053,308 B2 | 5/2006 | Prats et al. |
| 7,136,556 B2 | 11/2006 | Brown et al. |
| 7,144,952 B1 | 12/2006 | Court et al. |
| 7,411,129 B2 | 8/2008 | Kummer et al. |
| 7,557,301 B2 | 7/2009 | Kummer et al. |
| 7,749,024 B2 | 7/2010 | Chambers et al. |
| 8,043,119 B2 | 10/2011 | Kummer et al. |
| 2002/0002221 A1 | 1/2002 | Lee |
| 2002/0043391 A1 | 4/2002 | Suzuki et al. |
| 2002/0142175 A1 | 10/2002 | Hase et al. |
| 2003/0098176 A1 | 5/2003 | Mesaki et al. |
| 2003/0166749 A1 | 9/2003 | Eckstein et al. |
| 2004/0007308 A1 | 1/2004 | Houston et al. |
| 2004/0198909 A1 | 10/2004 | Breitscheidel et al. |
| 2005/0019353 A1 | 1/2005 | Prinz et al. |
| 2005/0023029 A1 | 2/2005 | Mammeri et al. |
| 2005/0036753 A1 | 2/2005 | Will et al. |
| 2005/0180725 A1 | 8/2005 | Carlson et al. |
| 2006/0065430 A1 | 3/2006 | Kummer et al. |
| 2007/0066726 A1 | 3/2007 | Sharma et al. |
| 2007/0098340 A1 | 5/2007 | Lee et al. |
| 2007/0243761 A1 | 10/2007 | Chambers et al. |
| 2009/0250238 A1 | 10/2009 | Picard et al. |
| 2010/0186987 A1* | 7/2010 | Aitken ............ H01B 9/028 174/102 R |
| 2010/0230134 A1 | 9/2010 | Chambers et al. |
| 2010/0236811 A1 | 9/2010 | Sasse et al. |

FOREIGN PATENT DOCUMENTS

| | | |
|---|---|---|
| EP | 0 544 411 | 6/1993 |
| EP | 1 524 294 A1 | 4/2005 |
| JP | 59159708 | 9/1984 |
| JP | 61076409 | 4/1986 |
| JP | 63094503 | 6/1988 |
| JP | 01110013 | 4/1989 |
| JP | 01144504 | 6/1989 |
| JP | 01166410 | 6/1989 |
| JP | 01307110 | 12/1989 |
| JP | 05266720 | 10/1993 |
| JP | 06057145 | 3/1994 |
| JP | 09045143 | 2/1997 |
| JP | 09251811 | 9/1997 |
| JP | 10012051 | 1/1998 |
| JP | 2001264601 | 9/2001 |
| JP | 2002231065 | 8/2002 |
| JP | 2003323820 | 11/2003 |
| WO | WO-89/00763 | 1/1989 |
| WO | WO-9913477 | 3/1999 |
| WO | WO-00/40653 | 7/2000 |
| WO | WO-01/081969 | 11/2001 |
| WO | WO-01/90230 | 11/2001 |
| WO | WO-0247092 | 6/2002 |
| WO | WO-05042226 | 5/2005 |
| WO | WO-2006/016896 | 2/2006 |
| WO | WO-2007/084745 | 7/2007 |

OTHER PUBLICATIONS

Axel Plastics Research Laboratories, Inc., Product Data Sheet re "Mold Wiz, INT-40DHT" (Approx. 2001) (1p).

(56) References Cited

OTHER PUBLICATIONS

Axel Plastics Research Laboratories, Inc., Product Data Sheet re "Mold Wiz, INT-40GHT" (Approx. 2001) (1p).
Canadian Office Action dated Jan. 29, 2019 in Application No. 2,740,654, 3 pages.
Cerro Wire, Inc.; Exhibit W-11-W-20 (Claim Charts), Request for Inter Partes Reexamination Under 35 U.S.C. \'a7\'a7311-318 (Control No. 95/000,594); Nov. 17, 2010; pp. 1-1023 (US).
Cerro Wire, Inc.; Exhibit W-1-W-10 (Claim Charts), Request for Inter Partes Reexamination Under 35 U.S.C. \'a7\'a7311-318 (Control No. 95/000,594); Nov. 17, 2010; pp. 1-1023 (US).
Cerro Wire, Inc.; Exhibit W-21-W-30 (Claim Charts), Request for Inter Partes Reexamination Under 35 U.S.C. \'a7\'a7311-318 (Control No. 95/000,594); Nov. 17, 2010; pp. 1-1023 (US).
Cerro Wire, Inc.; Exhibit W-31-W-38 (Claim Charts), Request for Inter Partes Reexamination Under 35 U.S.C. \'a7\'a7311-318 (Control No. 95/000,594); Nov. 17, 2010; pp. 1-1023 (US).
Cerro Wire, Inc.; Introductory Portion of Request for Inter Partes Reexamination Under 35 U.S.C. \'a7\'a7311-318 (Control No. 95/000,594); Nov. 17, 2010; pp. 1-37 (US).
Cerro Wire, Inc.; Request for Ex Parte Reexamination Under 35 U.S.C. \'a7\'a7311-318 (USPTO); Oct. 1, 2009; 359 pages.
Cerro Wire, Inc.; Request for Inter Partes Reexamination Under 35 U.S.C. \f1\'a7\'a7311-318 (USPTO); Sep. 26, 2008; pp. 1-90 (US).
Crompton Corporation brochure on Amides (approx. 2003) (27pp).
Crompton Corporation, Brochure entitled "Vinyl Additives Product Guide", (2002) (16pp).
Decoste, J. B.: "Friction of Vinyl Chloride Plastics," Bell Telephone Laboratories, Inc., Murray Hill, N.J., SPE Journal, Oct. 1969, vol. 25 (6 pages).
Definition of conduit from www.meriam-webster.com, Jun. 4, 2014, 4 pgs.
Dow Corning article "Siloxane additive minimizes friction in fibre optic cable conduit", 2001 (2pp) (http://www.dowcorning.com).
Dow Corning MB50-011 Masterbatch Product Information (4 pages), Ultra-high molecular weight siloxane polymer dispersed in polyamide 6, Jan. 15, 2001 (4pp).
Dow Corning presentation entitled "MBs to Improve CoF—Injection Moulding & Extrusion"; from filed entitled "DC (multibase) Masterbatch training 2004.ppt"; date uncertain; 8 pages (US).
Dow Corning Product Information sheet re Dow Corning MB25-504 composition, Jan. 2, 2002 (4pp) (http://www.dowcorning.com).
Dow Corning Product Information sheet re Dow Corning MB40-006 composition, Mar. 4, 2008 (1p) (http://www.dowcorning.com).
Dow Corning Product Information sheet re Dow Corning MB50-001 composition, Jan. 15, 2001 (6pp) (http://www.dowcorning.com).
Dow Corning Product Information sheet re Dow Corning MB50-002 composition, Jan. 15, 2001 (4pp) (http://www.dowcorning.com).
Dow Corning Product Information sheet re Dow Corning MB50-004 composition, Jan. 15, 2001 (4pp) (http://www.dowcorning.com).
Dow Corning Product Information sheet re Dow Corning MB50-008 composition, Mar. 4, 2008 (1pp) (http://www.dowcorning.com).
Dow Corning Product Information sheet re Dow Corning MB50-010 composition, Jan. 16, 2001 (2pp) (http://www.dowcorning.com).
Dow Corning Product Information sheet re Dow Corning MB50-011 composition, Mar. 4, 2008 (1 pp) (http://www.dowcorning.com).
Dow Corning Product Information sheet re Dow Corning MB50-320 composition, Mar. 4, 2008 (1p) (http://www.dowcorning.com).
Dow Corning Product Information sheet re Dow Corning MB50-321 composition, Jan. 15, 2001 (2pp) (http://www.dowcorning.com).
Dow Corning Product Information sheets re Dow Corning MB50-313 and MB50-314 composition, Jan. 15, 2001 (4pp) (http://www.dowcorning.com).

Dow Corning, Dow Corning MB50-011 Masterbatch Product Information, Ultra-high molecular weight siloxane polymer dispersed in nylon 6, 1999, pp. 1-5.
E.I. Du Pont de Nemours and Company, Flyer entitled "Teflon", (Aug. 14, 2003) (1p) (http://www.dupont.com).
Encore Wire Corporation; Request for Ex Parte Reexamination Statements Under 35 U.S.C. \'a7\'a71.150(b)(1) and 1.150(b)(2) (USPTO); Nov. 17, 2009; 44 pages.
Encore Wire, Inc.; Exhibits 1-9 (Claim Charts) of Corrected Request for Inter Partes Reexamination Under 35 U.S.C. \'a7\'a71.193 (Control No. 95/000,573); Oct. 8, 2010; pp. 1-137 (US).
Encore Wire, Inc.; Introductory Portion of Corrected Request for Inter Partes Reexamination Under 35 U.S.C. \'a7\'a71.193 (Control No. 95/000,573); Oct. 8, 2010; pp. 1-74 (US).
Examination Report for New Zealand Application No. 564551, dated Aug. 14, 2009.
Extended European Search Report for European Application No. EP 06739714.1, dated Nov. 12, 2009.
General Electric Company, Brochure entitled "GE Silicones—Fluids, Emulsions & Specialties", (2001) (19pp).
Howard & Howard letter to Mr. Thomas C. Wright dated Feb. 7, 2008 regarding U.S. Appl. No. 11/675,441 (2pp) (US).
International Search Report and Written Opinion dated Aug. 21, 2006 from WO 2007/81372 (International App. No. PCT/US06/11069).
International Search Report dated May 17, 2010 from WO 2010/107932 (International App. No. PCT/US2010/027684).
International Search Report dated Oct. 20, 2006 from WO 2006/127711 (International App. No. PCT/US06/19923).
International Search Report dated Dec. 20, 2005 from WO 2006/16895 (International App. No. PCT/US05/05165).
Non-Final Office Action on U.S. Appl. No. 12/792,642 dated Jun. 26, 2018.
Notice of Allowance on U.S. Appl. No. 12/792,642 dated Feb. 5, 2019.
Office Action for Co-Pending Patent Application No. 2008-513468 in Japan (Translation), dated Dec. 19, 2011, 12 pgs.
Office Action for Co-Pending Patent Application No. 88656 in Panama dated Oct. 6, 2011, 2 pgs.
Richard E. Marquis, Adam J. Maltby; An Introduction to Fatty Acid Amid Slip and Anti-Blocking Agents; Polymer, Laminations & Coatings Conf., Aug. 30, 1998; pp. 942-952 (US).
*Southwire Company v. Cerro Wire, Inc.*; Answer to Complaint for Patent Infringement and Demand for Jury Trial; Civil Action No. 3:08-CV-092-JTC; U.S.D.C.; Northern District of Georgia; Newnan Division; Oct. 16, 2008; 8 pp (US).
*Southwire Company v. Cerro Wire, Inc.*; Complaint for Patent Infringement and Demand for Jury Trial (with Exhibit A), Civil Action No. 3:08-CV-092-JTC, U.S.D.C.; Northern District of Georgia; Newnan Division; Aug. 12, 2008; 16 pp (US).
*Southwire Company v. Cerro Wire, Inc.*; Defendant Cerro Wire Inc.'s Motion to Stay Pending Reexamination of the Patent-in-Suit; Civil Action No. 3:08-CV-092-JTC; U.S.D.C.; Northern District of Georgia; Newnan Division; Dec. 12, 2008; 11 pp (US).
*Southwire Company v. Cerro Wire, Inc.*; Defendant Cerro Wire, Inc.'s Response to Plaintiff's Motion to Dismiss Cerro's Invalidity Defenses Under 35 U.S.C. 102 and 103; Civil Action No. 3:08-CV-092-JTC; U.S.D.C.; Northern District of Georgia; Newnan Division; Jan. 16, 2009; 7 pp (US).
*Southwire Company v. Cerro Wire, Inc.*; Defendant Cerro Wire's Reply Memorandum in Support of its Motion to Stay Pending Reexamination of the Patent-in-Suit; Civil Action No. 3:08-CV-092-JTC; U.S.D.C.; Northern District of Georgia; Newnan Division; Jan. 16, 2009; 17 pp (US).
*Southwire Company v. Cerro Wire, Inc.*; Southwire Company's Motion, Memorandum and [Proposed] Order to Dismiss Cerro Wire Inc.'s Defenses of Invalidity Under 35 U.S.C. 102 and 103; Civil Action No. 3:08-CV-092-JTC; U.S.D.C.; Northern District of Georgia; Newnan Division; Jan. 2, 2009; 19 pp (US).
*Southwire Company v. Cerro Wire, Inc.*; Southwire Company's Reply in Support of its Motion to Dismiss Cerro Wire Inc.'s Defenses of Invalidity Under 35 U.S.C. 102 and 103 and Further Opposition to Cerro Wire, Inc.'s Motion for Stay Pending Reex-

(56) References Cited

OTHER PUBLICATIONS amination of the Patent-in-Suit; Civil Action No. 3:08-CV-092-JTC; U.S.D.C.; Northern District of Georgia; Newnan Division; Jan. 26, 2009; 16 pp (US).

*Southwire Company* v. *Cerro Wire, Inc.*; Southwire's Opposition to Defendant's Motion for Stay Pending Reexamination of the Patent-in-Suit (with Declarations of Winn Wise and Holly S. Hawkins); Civil Action No. 3:08-CV-092-JTC; U.S.D.C.; Northern District of Georgia; Newnan Division; Jan. 2, 2009; 75 pp (US).

*Southwire Company* v. *Encore Wire Corporation and Cerro Wire, Inc.*; Southwire Company's Answer to Encore Wire Corporation's First Amended Answer, Affirmative Defenses, and Counterclaims, Civil Action No. 6:09-CV-289-LED; U.S.D.C. for the Eastern District of Texas, Tyler Division, Feb. 12, 2010, 17 pp. (US).

*Southwire Company* v. *Cerro Wire, Inc.*; Court Order Granting Stay of Litigation pending USPTO's Reexamination of U.S. Pat. No. 7,411,129, Civil Action No. 3:08-CV-092-JTC; U.S.D.C.; Northern District of Georgia, Newnan Division, May 12, 2009, 13 pp. (US).

Southwire Company; Response to Request for Inter Partes Reexamination (USPTO); Oct. 21, 2008; pp. 1-27 (US).

Third Party Observations Against EP Patent Applicaiton No. 06-739-714.1 of Southwire Company (published as EP1899987) dated Apr. 7, 2012.

Third Party Observations Against EP Patent Applicaiton No. 06-770-960.0 of Southwire Company (published as EP1899988) dated Apr. 7, 2012.

U.S. Appl. No. 60/544,224, filed Feb. 12, 2004, Carlson et al., 3 pp.

Underwriters Laboratories Inc., Standard for Safety for Metal-Clad Cables, UL 1569, Sep. 10, 1998, 159 pgs.

United States Patent and Trademark Office, Notice of Allowance in U.S. Appl. No. 12/017,222, dated Jan. 8, 2009 (11 pp).

United States Patent and Trademark Office, Notice of Allowance in U.S. Appl. No. 12/017,222, dated Feb. 27, 2009 (8 pp).

United States Patent and Trademark Office, Notice of Allowance in U.S. Appl. No. 12/017,222, dated Dec. 5, 2008 (12 pp).

United States Patent and Trademark Office, Office Action in U.S. Appl. No. 10/952,294, dated Aug. 7, 2007, 11 pp (US).

United States Patent and Trademark Office, Office Action in U.S. Appl. No. 10/952,294, dated Jul. 12, 2006, 13 pp (US).

United States Patent and Trademark Office, Office Action in U.S. Appl. No. 10/952,294, dated Mar. 14, 2007, 10 pp (US).

United States Patent and Trademark Office, Office Action in U.S. Appl. No. 10/952,294, dated Mar. 4, 2008, 6 pp (US).

United States Patent and Trademark Office, Office Action in U.S. Appl. No. 11/120,487, dated Nov. 2, 2005 (5pp).

United States Patent and Trademark Office, Office Action in U.S. Appl. No. 11/120,487, dated Jun. 8, 2006 (13pp).

United States Patent and Trademark Office, Office Action in U.S. Appl. No. 11/135,807, dated Dec. 15, 2005 (9pp).

United States Patent and Trademark Office, Office Action in U.S. Appl. No. 11/135,807, dated Jun. 8, 2006 (13pp).

United States Patent and Trademark Office, Office Action in U.S. Appl. No. 11/313,596, dated Mar. 20, 2007 (14pp).

United States Patent and Trademark Office, Office Action in U.S. Appl. No. 11/675,441, dated Dec. 28, 2007 (4pp).

United States Patent and Trademark Office, Office Action in U.S. Appl. No. 11/858,766, dated Feb. 9, 2009, 11 pp (US).

United States Patent and Trademark Office, Office Action in U.S. Appl. No. 11/858,766, dated Jun. 9, 2008, 8 pp (US).

United States Patent and Trademark Office, Office Action in U.S. Appl. No. 12/017,222, dated Aug. 7, 2008, 8 pp (US).

United States Patent and Trademark Office; Office Action in Inter Partes Reexamination of U.S. Pat. No. 7,749,024 (U.S. Appl. No. 95/000,573), dated Dec. 3, 2010, 12 pages (US).

United States Patent and Trademark Office; Office Action in Inter Partes Reexamination of U.S. Pat. No. 7,749,024 (U.S. Appl. No. 95/000,594), dated Feb. 11, 2011, 25 pages (US).

United States Patent and Trademark Office; Office Action in U.S. Appl. No. 11/675,441; dated Oct. 6, 2008, 6 pages (US).

United States Patent and Trademark Office; Order Granting/Denying Request for Inter Partes Reexamination of U.S. Pat. No. 7,411,129 (with attached PTO/SB/08) (U.S. Appl. No. 95/000,403); Dec. 5, 2008; 25 pages (US).

United States Patent and Trademark Office; Response to Office Action in Inter Partes Reexamination of U.S. Pat. No. 7,749,024 (U.S. Appl. No. 95/000,573), dated Feb. 3, 2011, 1-17 pages (US).

United States Patent and Trademark Office; Response to Office Action in Inter Partes Reexamination of U.S. Pat. No. 7,749,024 (U.S. Appl. No. 95/000,594), dated Apr. 11, 2011, 1-35 pages (US).

U.S. Office Action on U.S. Appl. No. 12/792,642 dated May 13, 2019.

Wild, Frank: "The Effects of Silicone Polymer Additions on the Processing and Properties of an Isotactic Propylene Homopolymer," Sep. 1995 (102 pages).

Wiles, John, "Clarifying Confusing Cables," Home Power #66, Aug.-Sep. 1998.

Witco Corporation, Brochure entitled "Fatty Acids, Glycerine, Triglycerides", (1997) (22pp).

* cited by examiner

FLEXIBLE CABLE WITH STRUCTURALLY ENHANCED CONDUCTORS

CROSS REFERENCE TO RELATED APPLICATIONS

This application is a continuation of co-pending U.S. patent application Ser. No. 12/792,642, filed Jun. 2, 2010, now U.S. Pat. No. 10,325,696, the contents of which are incorporated herein by reference in its entirety.

BACKGROUND

Metal-clad cables having a metal sheath potentially provide a low impedance and reliable ground path in order to function as an equipment grounding conductor. One type of such cable described in U.S. Pat. No. 6,486,395, assigned to the assignee of the present invention, contains a conductor assembly having at least two electrically insulated conductors cabled together longitudinally into a bundle and enclosed within a binder/cover. A bare grounding conductor is cabled externally over the binder/cover, preferably within a trough/interstice formed between the insulated conductors. In one type of metal-clad cable, the metal sheath is helically applied to form an interlocked armor sheath around the conductor assembly, and the bare grounding conductor is adapted to contact the sheath to provide the low impedance ground path.

However, in order to maximize the structural integrity of these and other types of cables, it is important that the conductors disposed within the metal clad cable be configured to withstand the various forces exerted on the cable during manufacturing, storage and/or installation. One solution is to enclose the conductors within the binder or cover to provide additional stability to the conductors disposed therein, especially additional strength against crushing forces. Another solution includes providing a talc powder around the conductors and beneath the binder/cover, providing a talc powder between the binder/cover and outer sheath and/or wrapping a Teflon wrap around each conductor (and talc, if present) prior to applying the binder/cover, in order to improve abrasion resistance, especially during flexing of the cable. However, cables having such configurations are costly to manufacture and can complicate manufacturing and field installation. For example, when terminating a cable, the binder/cover and Teflon wrap oftentimes remain exposed and must be separately cut or peeled away from the conductor assembly. This results in increased unnecessary material waste and increased labor costs.

SUMMARY

Embodiments provided herein contain an improved electrical cable of the type having an outer sheath enclosing a conductor assembly. The conductor assembly comprises a plurality of insulated conductors with a strength enhancer to provide increased resistance against crushing forces thereby obviating the need for a binder/cover disposed around the conductor assembly. According to embodiments disclosed herein, the strength enhancer may include a silicone oil, an erucamide and/or generally increasing the thickness of the conductor insulation such that, for example, the cable conforms to the performance criteria established by UL 1569.

In addition, embodiments provided herein include a method of increasing crush resistance of an electrical cable having an outer sheath enclosing a conductor assembly. In particular, methods disclosed herein provide for insulating one or more conductors, wherein insulating the one or more conductors includes providing a strength enhancer within the insulation and enclosing the insulated conductors with the outer sheath, wherein the electrical cable has increased crushed resistance without the need for a binder/cover.

BRIEF DESCRIPTION OF THE DRAWINGS

For a more complete understanding of the present invention, including additional features, objects and advantages thereof, reference is now made to the following detailed description, taken in conjunction with the drawings, in which.

DETAILED DESCRIPTION

Figure 1:
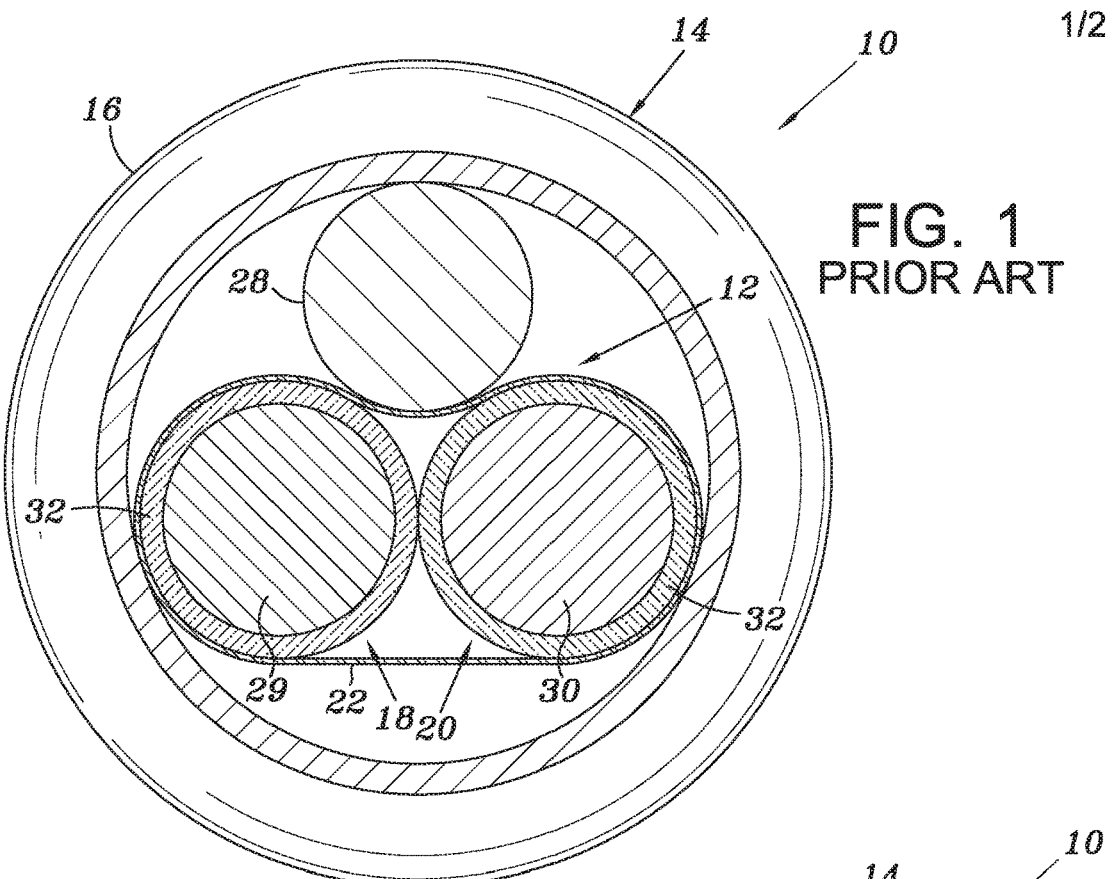
FIG. 1 is cross-sectional view of a prior art type metal-clad cable showing a conductor assembly comprising two electrically insulated conductors enclosed in a cover.

In the description which follows, like parts are marked throughout the specification and drawings with the same reference numerals, respectively. The drawings may not be to scale and certain features may be shown exaggerated in scale or in somewhat schematic form in the interest of clarity and conciseness.

Figure 2:
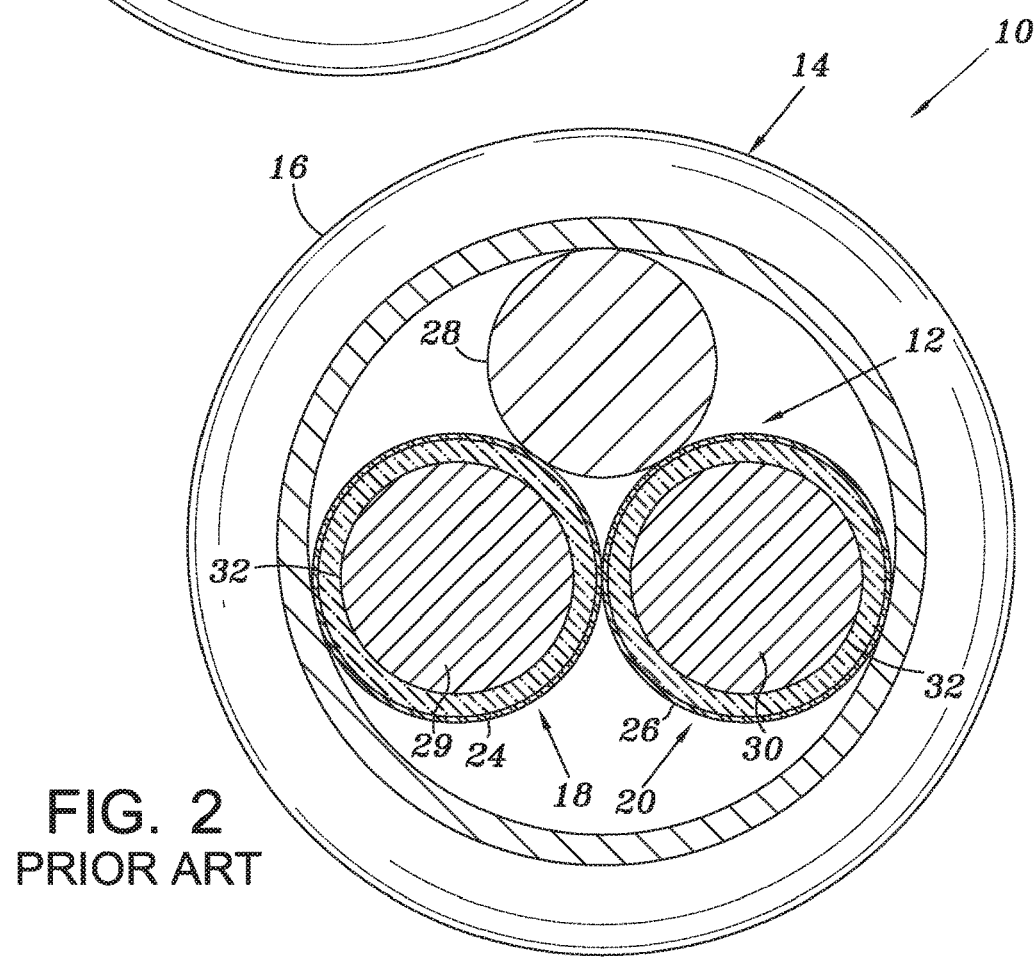
FIG. 2 is a cross-sectional view of another prior art type metal-clad cable illustrating a conductor assembly comprising two electrically insulated conductors enclosed in respective covers.

FIGS. 1 and 2 are diagrams illustrating a prior art flexible cable 10 in which a conductor assembly 12 is employed to advantage. In FIGS. 1 and 2, flexible cable 10 comprises a metal-clad armored electrical cable 14 characterized by an outer sheath or armor 16 (hereinafter referred to as sheath 16) disposed around conductor assembly 12. As illustrated in FIG. 1, conductor assembly 12 comprises two elongated and flexible insulated electrical conductors 18 and 20 disposed within a binder/cover 22 (hereinafter referred to as cover 22); however, it should be understood that each electrical conductor 18, 20 can be disposed within a respective cover 24 and 26, as illustrated in FIG. 2. A bare grounding conductor 28, such as, for example, a bare aluminum wire, is externally disposed with respect to covers 22, 24 and/or 26 and adjacent to conductor assembly 12.

As seen in FIGS. 1 and 2, electrical conductors 18 and 20 each include respective metallic wires 29 and 30 disposed within respective insulation 32 for protecting the metallic wires 29 and 30. While FIGS. 1 and 2 illustrate two conductors 18 and 20, it should be understood that cable 10 may have a greater or fewer number of conductors and a greater number of bare grounding conductors or no grounding conductors, depending on the type of cable and the particular application with which the cable 10 is to be used. In FIGS. 1 and 2, sheath 16 is formed of a metal strip having overlapping and interlocking adjacent helical convolutions, an example of which is described in U.S. Pat. No. 6,906,264, assigned to the assignee of the present invention, the disclosure of which is incorporated by reference herein; however, it should be understood that sheath 20 may be otherwise configured, such as, for example, a solid or non-interlocked metallic or non-metallic covering.

Covers 22, 24 and 26 of FIGS. 1 and 2 function to, among other things, act as a protective layer to enhance mechanical performance of cable 10. For example, covers 22, 24, 26 increase resistance to crushing and impact forces while still maintaining optimal flexibility of cable 10. The construction guidelines provided in Underwriters Laboratory Standard for Safety for Metal Clad Cables UL 1569 in effect as of the filing date of the present application (hereinafter UL 1569), the disclosure of which is incorporated herein by reference, call for a cover 22, 24, 26 for any cable assembly that contains a bare metal component such as a grounding conductor, a metal shielding tape, a drain wire or assemblies that are enclosed in an interlocked metal armor. For example, section 12.3 of UL 1569 provides for a cover composed of an elastomer-filled cloth or nylon tape that is frictioned on one or both sides. The cloth or tape can be of any necessary width, but must be at least 10 mils or 0.25 mm thick if of cloth and 6 mils or 0.15 mm if of nylon and should be helically applied. Alternatively, the covering can comprise a treated paper tape that is of any necessary width, and is at least 12 mils or 0.30 mm thick and should also be applied helically. Additionally, the covering can comprise a flat or corrugated polyethylene or terephthalate or other polyester tape or a polypropylene tape that is at least 2 mils or 0.05 mm thick.

Embodiments described herein provide an improved flexible cable 10 and method of making a flexible cable 10 having improved crush resistance comprising insulated conductors 18 and 20 each having a strength enhancer applied therein and/or thereto to enable cable 10 to be fabricated and used without cover(s) 22, 24, 26 and still maintain the mechanical performance characteristics such as those required under UL 1569. For example, as illustrated in FIG. 3, insulation 32 comprises a predetermined thickness "t" such that the advantages and functions provided by cover(s) 22, 24, 26 (i.e., increased resistance to crushing and impact forces while still maintaining optimal flexibility) are retained via insulation 32 rather than utilizing cover(s) 22, 24, 26, as illustrated in FIGS. 1 and 2.

Figure 3:
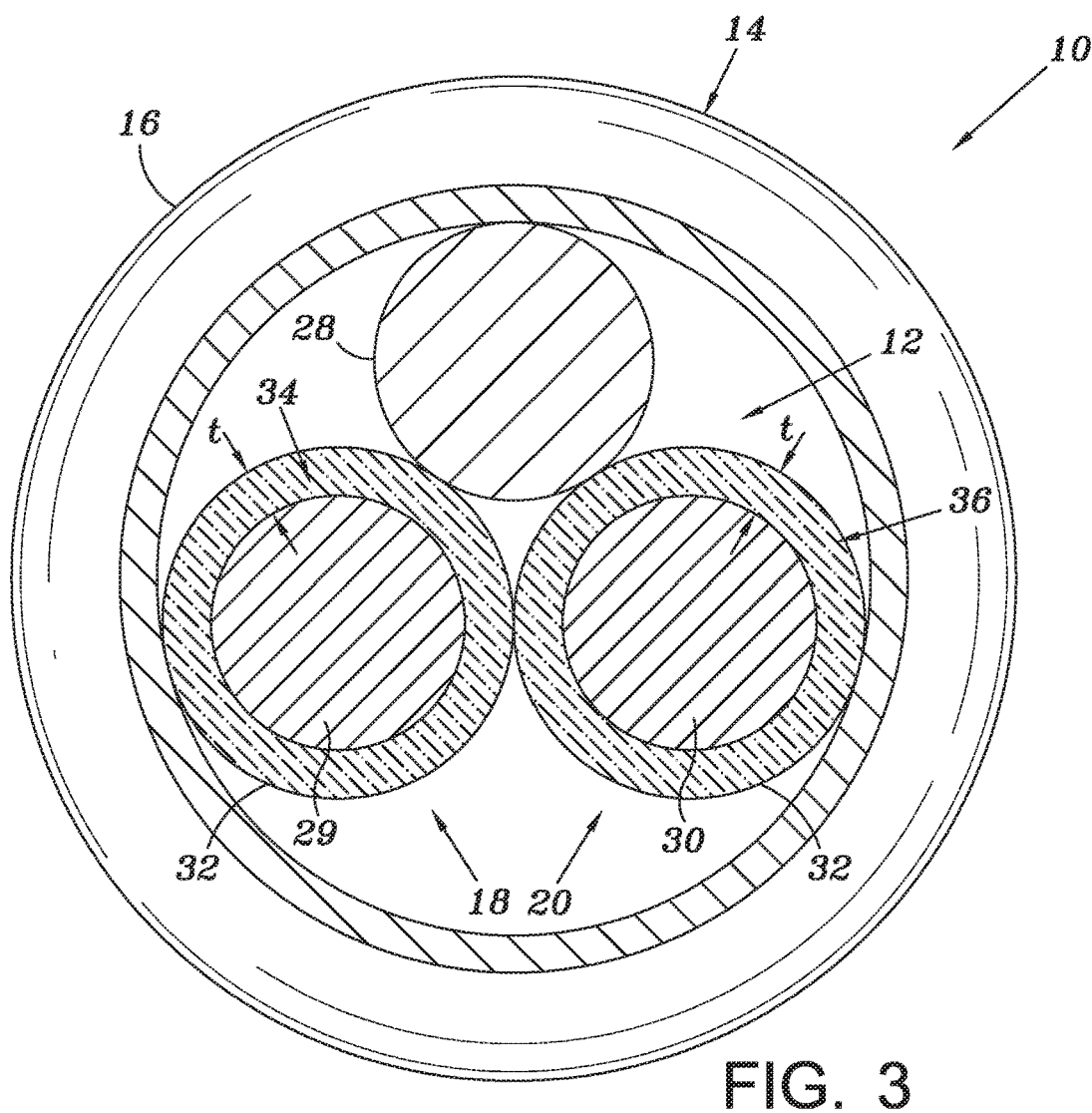
FIG. 3 is a cross sectional view of a metal-clad cable illustrating a conductor assembly comprising three electrically insulated conductors, each employing a strength enhancer to advantage.

In the embodiment illustrated in FIG. 3, insulation 32 surrounds respective wires 28 and 30. Insulation 32 contains an inner region 34 disposed generally around and in contact with wires 29 and 30 and an outer or extended region 36 integral with an inner region 34 and disposed generally along and forming the outer portion of insulation 32. Outer region 36 is sized to a predetermined thickness such that the combined inner and outer regions 34 and 36 comprise a combined thickness equal to or greater than the minimum thickness required by Underwriters Laboratory in order to maintain the performance characteristics required under UL 1569.

Preferably, the size of inner and outer regions 34 and 36 is dictated by performance criteria established by UL 1569. For example, UL 1569 describes various performance tests required of the finished cable (i.e., cable 10), one of which includes a crushing test. Inner and outer regions 34 and 36 are dimensioned based on performance criteria established in UL 1569 to determine the necessary thickness such that when cover 22, 24 and/or 26 is removed from conductor assembly 12, enhanced insulation 32 performs the functions that are otherwise performed by cover(s) 22, 24 and/or 26.

Additionally or alternatively, strength enhancer can include either a silicone oil or erucamide, which has been found to increase the crush resistance of insulation 32. In accordance with the testing subsequently described, it has been found that the crush resistance of an insulated wire sample having a silicone oil applied thereto is increased by almost 30% compared to an insulated wire sample not having a silicone oil applied thereto.

In accordance with one testing method, a pair of insulated conductors and a bare grounding conductor were wrapped within a metallic sheath. One cable contained pair of insulated conductors having a silicone oil applied thereto and the other cable contained a pair of insulated conductors without any silicone oil or strength enhancement applied thereto. The respective sizes of the conductors and cables were identical.

A force was applied to the cable assembly in accordance with UL 1569 and the force values, as listed in Tables 1 and 2 below, were determined. In particular, the cables were crushed between flat and horizontal steel plates in a compression machine. A solid steel rod was secured to the upper face of the lower steel plate and the cable was placed in between the steel plates and on top of the solid steel rod. Three separate cables were tested for each cable type (i.e., the strength enhanced and non-strength enhanced) at ten different points along the respective cables. During testing, the plates were compressed with increasing force on the cable until it was determined that contact had occurred between the conductors or between one or more of the conductors and the grounding conductor, the armor or both. Table 1 illustrates the test results without the strength enhancer. Table 2 illustrates the test results with conductors having the strength enhancer. As seen, the strength enhancer provided an increase in performance of almost 30% over the cable that did not utilize the strength enhancer.

TABLE 1

Test Data without Strength Enhancer

| Test No. | Cable 1 (Load Force) | Cable 2 (Load Force) | Cable 3 (Load Force) |
|---|---|---|---|
| 1 | 585 | 585 | 584 |
| 2 | 641 | 598 | 1669 |
| 3 | 977 | 636 | 573 |
| 4 | 1953 | 639 | 653 |
| 5 | 681 | 1101 | 1110 |
| 6 | 613 | 633 | 591 |
| 7 | 585 | 890 | 679 |
| 8 | 699 | 682 | 1256 |
| 9 | 760 | 659 | 621 |
| 10 | 569 | 1672 | 1024 |
| Average Load Force | 852.5 | 809.5 | 876 |

TABLE 2

Test Data with Strength Enhancer

| Test No. | Cable 1 (Load Force) | Cable 2 (Load Force) | Cable 3 (Load Force) |
|---|---|---|---|
| 1 | 560 | 474 | 1366 |
| 2 | 1353 | 507 | 708 |
| 3 | 1593 | 1333 | 699 |
| 4 | 1121 | 1559 | 1572 |
| 5 | 1426 | 1534 | 677 |
| 6 | 698 | 1552 | 649 |
| 7 | 1858 | 1169 | 1605 |
| 8 | 512 | 1448 | 607 |
| 9 | 1712 | 518 | 690 |
| 10 | 488 | 1291 | 1495 |
| Average Load Force | 1132.1 | 1138.5 | 1006.8 |

According to some embodiments, insulation 32 contains 0.25-0.85% of erucamide and a stearyl erucamide mixed into the conductor insulation 32. According to some embodiments, the silicone oil is a high molecular weight silicone oil. For example, the concentration, by weight, of the high molecular weight silicone oil is at least 9% by weight of the conductor insulation 32.

FIG. 3 depicts typical equipment 50 for manufacturing conductors 18, 20 in accordance with one process of the present invention. According to some embodiments, insulation 32 is of an extruded polymer material such as, for example, nylon. Equipment 50 may include a reel 52 which supplies metallic wires 29, 30 to an extruding head 54. Nylon pellets 56 are stored in tank 58, which is in flow communication with the extrusion head 54. A tank 60 with the desired strength enhancer 62 is adapted to be in flow communication with the tank 58 by way of conduit 64, thus enabling the mixing of the strength enhancer 62 with the nylon pellets 56, the mixture thereafter introduced into extruder 54. Alternatively, tank 60 may be adapted to be in fluid communication with extruder 54 by way of conduit 66, downstream from the point of entry of the nylon material, thus allowing strength enhancer 62 to mix with the nylon material 56 while in its molten state in the extruder. A cooling box 68 for cooling the extruded product is provided, and a take-up reel 70 is positioned for taking up the resulting conductor 18, 20.

Figure 4:
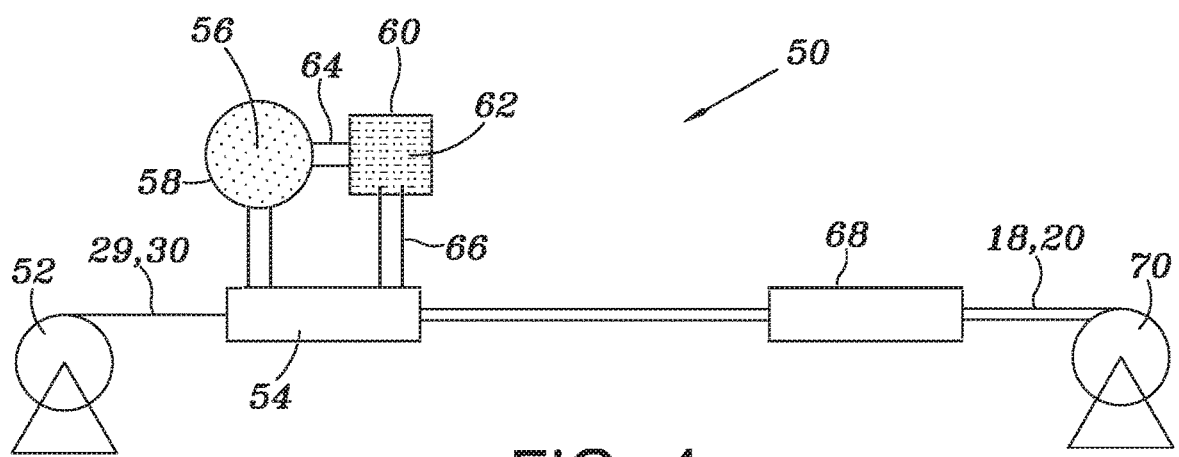
FIG. 4 is a diagram illustrating the use of typical manufacturing equipment uses in the manufacture of the insulated conductors having the strength enhancer.

As is therefore evident, the strength enhancer can be mixed with the material from which the insulation is to be extruded prior to extrusion or, alternatively, introduced into the extruding head for subsequent mixing with the molten extrusion material as the sheath is being formed. As a further alternative, the strength enhancer can be initially compounded with the polymeric material of the pellets themselves in a process upstream of that depicted in FIG. 4, thereby forming strength enhanced polymeric pellets, thus eliminating the need for tank 62 and conduits 64 and 66. Finally the strength enhancer can be applied to the insulation after the conductor has been extruded.

Polymeric materials that can be used for insulation 32 include polyethylene, polypropylene, polyvinylchloride, organic polymeric thermosetting and thermoplastic resins and elastomers, polyolefins, copolymers, vinyls, olefin-vinyl copolymers, polyamides, acrylics, polyesters, fluorocarbons, and the like.

According to some embodiments, in addition to increasing crush resistance, it has been found that the strength enhancer can be used to increase the abrasion resistance of insulation 32. For example, cable 10 is oftentimes provided with talc powder disposed around conductors 18, 20 and beneath the binder/cover 22. In some applications, a talc powder can also be disposed the binder/cover and outer sheath, which is used to increase the abrasion resistance of conductors 18 and 20, especially during flexing of cable 10. Additionally, a Teflon wrap can be applied around each conductor (and talc, if present) prior to applying the binder/cover, in order to improve abrasion resistance. However, it has been found that applying silicone oil or erucamide also acts to, in addition to increasing crush resistance of conductor insulation 32, increase abrasion resistance.

Although specific embodiments have been described in detail, those skilled in the art will also recognize that various substitutions and modifications may be made without departing from the scope and spirit of the appended claims.

What is claimed is:

1. An electrical cable having a metallic outermost sheath, the electrical cable comprising:
   a conductor assembly including an insulated conductor disposed within the metallic outermost sheath; and
   a grounding conductor disposed adjacent to and contacting at least a portion of the conductor assembly;
   the insulated conductor consisting of an outermost surrounding layer without an additional protective covering about the outermost surrounding layer, the outermost surrounding layer having a lubricant, the outermost surrounding layer being in direct contact with the metallic outermost sheath substantially along the length of the insulated conductor and the metallic outermost sheath;
   wherein the lubricant is included in an amount such that the combination of the outermost surrounding layer and the lubricant maintains the crush and impact resistance as required by UL 1569 second edition, revision of Sep. 10, 1998 without the electrical cable having a further protective covering between the insulated conductor and the metallic outermost sheath.

2. The electrical cable of claim 1, wherein the outermost surrounding layer comprises an extruded nylon polymer.

3. The electrical cable of claim 1, wherein the lubricant is mixed within the outermost surrounding layer.

4. The electrical cable of claim 1, wherein the grounding conductor is bare.

5. The electrical cable of claim 1, wherein the lubricant includes 0.25-0.85% of erucamide and a stearyl erucamide.

6. The electrical cable of claim 1, wherein the lubricant comprises a high molecular weight silicone oil having a concentration by weight of at least 9%.

7. An electrical cable having a metallic outermost sheath, the electrical cable comprising:
   a grounding conductor and a conductor assembly including an insulated conductor, the grounding conductor positioned adjacent to and in contact with at least a portion of the insulated conductor, the grounding conductor and the conductor assembly disposed within the metallic outermost sheath;
   wherein the insulated conductor includes an outermost surrounding layer comprising a strength enhancer, the strength enhancer including 0.25-0.85% of erucamide and a stearyl erucamide, the outermost surrounding layer being in direct contact with the metallic outermost sheath substantially along the length of the conductor and the metallic outermost sheath;
   wherein the outermost surrounding layer comprising the strength enhancer is formed to maintain the crush and impact resistance as required by UL 1569 second edition, revision of Sep. 10, 1998; and
   the electrical cable does not comprise a further protective covering between the insulated conductor and the metallic outermost sheath.

8. The electrical cable of claim 7, wherein the grounding conductor is bare.

9. An electrical cable comprising:
   a metallic outer sheath conductively contacting a bare grounding conductor disposed within the metallic outer sheath;
   an insulated conductor consisting of an outer layer comprising a lubricant, the outer layer of the insulated conductor remaining in direct contact with the metallic outer sheath, and substantially along the length of the insulated conductor and the metallic outer sheath,
   the lubricant comprising 0.25-0.85% of erucamide and a stearyl erucamide;
   wherein:

the electrical cable does not have an additional protective covering between the outer layer and the metallic outer sheath; and the electrical cable meets the crush and impact resistance requirements of UL 1569 second edition, revision of Sep. 10, 1998.

10. The electrical cable of claim 9, wherein the outer layer comprises an outer region and an inner region, the outer region having the lubricant mixed therein.

11. The electrical cable of claim 9, wherein the lubricant is applied on the outer layer of the insulated conductor.

12. The electrical cable of claim 11, wherein the lubricant comprises a silicone oil.

13. An apparatus for protecting an electrical cable assembly including one or more insulated conductors, each insulated conductor consisting of a single outer surrounding layer, the apparatus comprising: an outermost metallic sheath surrounding the electrical cable assembly; the one or more insulated conductors, in which each single outer surrounding layer is in direct contact with the outermost metallic sheath substantially along the length of the electrical cable assembly and the outermost metallic sheath; a grounding conductor contacting at least a portion of the one or more insulated conductors; and a strength enhancer formed of a high molecular weight silicone oil having a concentration by weight of at least 9% or a lubricant material including 0.25-0.85% of erucamide and a stearyl erucamide, the strength enhancer applied such that the outermost metallic sheath and the electrical cable assembly meet the crush and impact resistance requirements in UL 1569 second edition, revision of Sep. 10, 1998 without any additional layer between the insulated conductors and the outermost metallic sheath.

14. The apparatus of claim 13, wherein the grounding conductor is a bare grounding conductor in direct contact with the outermost metallic sheath.

15. The apparatus of claim 13, wherein the strength enhancer is applied to the single outer surrounding layer of the one or more insulated conductors.

16. The apparatus of claim 13, wherein the strength enhancer is mixed in the one or more insulated conductors.

17. An electrical cable having a metallic outer sheath, the electrical cable comprising a conductor assembly including a bare grounding conductor and an electrically insulated conductor disposed adjacent to and contacting at least a portion of the bare grounding conductor, the electrically insulated conductor being a Type XHHW consisting of a surrounding layer consisting of a cross-linked polyethylene material having a strength enhancer comprising a lubricant to maintain a crush and impact resistance of the conductor assembly when surrounded by the metallic outer sheath meeting the requirements of UL 1569 second edition, revision of Sep. 10, 1998 without requiring an additional protective covering between the surrounding layer and the metallic outer sheath, wherein the surrounding layer comprises the cross-linked polyethylene material and the strength enhancer being in direct contact with the metallic outer sheath and substantially along the length of the electrically insulated conductor and the metallic outer sheath.

18. The electrical cable of claim 17, wherein the strength enhancer comprises an erucamide and the erucamide is applied to the surrounding layer.

19. The electrical cable of claim 17, wherein the strength enhancer comprises a silicone oil and the silicone oil is applied to the surrounding layer.

20. An electrical cable having a metallic outer sheath, the electrical cable comprising:

a conductor assembly, including a bare grounding conductor and an electrically insulated conductor contacting the bare grounding conductor, the electrically insulated conductor being a Type THHN consisting of a surrounding layer, the surrounding layer consisting of an outer portion of a nylon material around an inner portion of a polyvinylchloride material, and the outer portion having strength enhancer comprising a lubricant in an amount to maintain a crush and impact resistance of the conductor assembly when surrounded by the metallic outer sheath meeting the requirements of UL 1569 second edition, revision of Sep. 10, 1998 without requiring an additional protective covering between the surrounding layer and the metallic outer sheath; and the surrounding layer comprising the strength enhancer being in direct contact with the metallic outer sheath, and substantially along the length of the conductor and the metallic outer sheath.

21. The electrical cable of claim 20, wherein the strength enhancer comprises an erucamide and the erucamide is applied to the surrounding layer.

22. The electrical cable of claim 20, wherein the strength enhancer comprises a silicone oil and the silicone oil is applied to the surrounding layer.

\* \* \* \* \*